Figure 1:
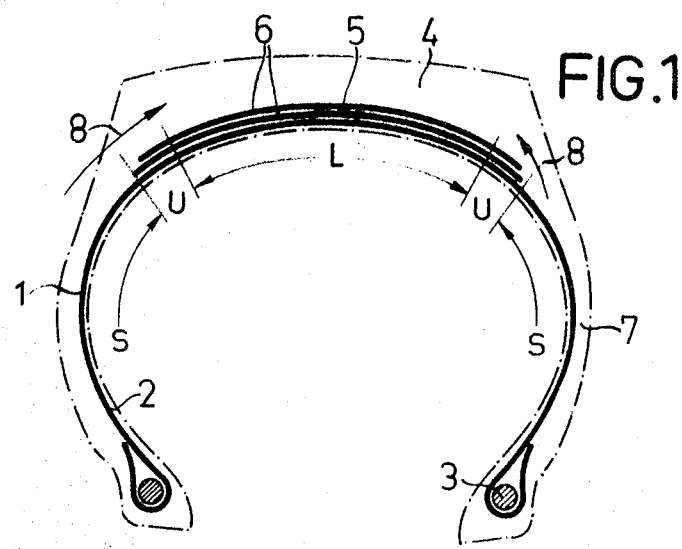

United States Patent
Wittneben

[15] 3,665,993
[45] May 30, 1972

[54] PNEUMATIC VEHICLE TIRE

[72] Inventor: Hermann Wittneben, Hannover, Germany

[73] Assignee: Continental Gummi-Werke Aktiengesellschaft, Hannover, Germany

[22] Filed: Dec. 16, 1970

[21] Appl. No.: 98,711

[30] Foreign Application Priority Data

Dec. 17, 1969 Germany ..................... P 19 63 260.1

[52] U.S. Cl. ............................................. 152/356, 152/359
[51] Int. Cl. ....................................... B60c 9/02, B60c 9/20
[58] Field of Search ......................... 152/354, 355, 356, 359

[56] References Cited

UNITED STATES PATENTS

| | | | |
|---|---|---|---|
| 3,217,778 | 11/1965 | Kovac et al. | 152/359 |
| 3,532,150 | 10/1970 | Wittneben | 152/354 |
| 3,540,512 | 11/1970 | Heimovics, Jr. et al. | 152/359 |
| 3,581,793 | 6/1971 | Wittneben | 152/354 |

Primary Examiner—Drayton E. Hoffman
Attorney—Walter Becker

[57] ABSTRACT

A pneumatic vehicle tire with a carcass having twisted strength carriers extending at least approximately at a right angle with regard to the circumferential direction of the tire in which the number of twists of the strength carriers within the region of the side walls of the tire is considerably less than the number of the twists of the strength carriers within the region radially inwardly of the belt of the tire.

2 Claims, 4 Drawing Figures

Patented May 30, 1972

3,665,993

INVENTOR
HERMANN WITTNEBEN

BY

PNEUMATIC VEHICLE TIRE

The present invention relates to a pneumatic vehicle tire with a carcass with thread-shaped strength carriers extending at a right angle or at an approximately right angle with regard to the circumferential direction of the tire and with a pull-resistant belt which extends substantially over the width of the tread strip, the strength carriers consisting of two or more twisted threads, yarns, wires, or the like and being radially inwardly of the belt free from pulling stress or practically free from pulling stress when the tire has its inner pressure established therein.

It is known so to design the above mentioned pneumatic tires that the carcass sections radially inwardly of the belt are upset and also when the tire is in operation or is subjected to its inner pressure. Such carcass design has the advantage that within the region of the zenith portion of the tire, the forces to be absorbed by the carcass threads will be induced in the tire belt in order to preload the belt not only in circumferential direction of the tire but also in a direction transverse thereto. As a result thereof, the loadability of the tire will be increased.

Based on this finding, it is an object of the present invention so to design the strength carriers for the carcass that in the tire side walls the strength carriers have a relatively great strength in the longitudinal direction of the threads while on the other hand permitting to an increased extent an elastic expansion of the strength carriers in the longitudinal direction of the threads and, more specifically, below the belt when comparatively high shock forces act radially upon the tire.

These and other objects and advantages of the invention will appear more clearly from the following specification in connection with the accompanying drawing, in which:

FIG. 1 diagrammatically illustrates a radial section through a portion of a pneumatic vehicle tire according to the invention.

Figure 2:
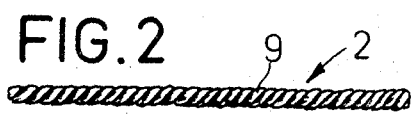
Figure 3:

FIGS. 2 and 3 respectively illustrate portions of strength carriers for the tire carcass of the tire according to the invention according to FIG. 1.

Figure 4:
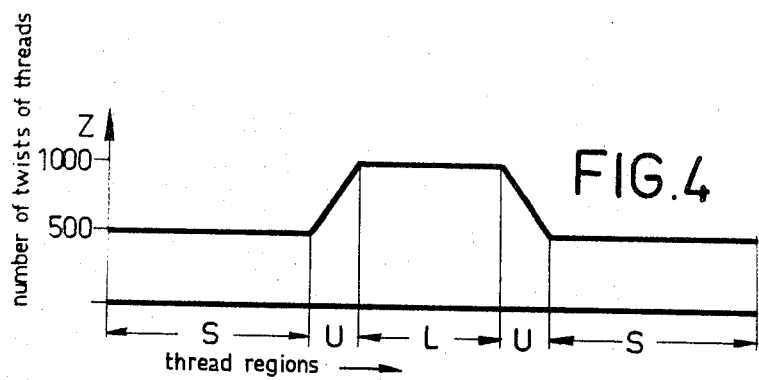

FIG. 4 is a graph illustrating the relationship of the number of twists of the strength carriers with regard to the various strength carrier sections in the tire.

The pneumatic vehicle tire yarns, to the invention which comprises a carcass of strength carriers extending at a right angle or nearly right angle with regard to the circumferential direction of the tire and with a substantially pull-resistant belt extending over the width of the tread strip while the strength carriers consist of two or more twisted threads, yarns wires, or the like, and radially inwardly of the belt are free from or are substantially free from pull stresses when the tire is under its inner pressure, is characterized primarily in that the number of twists of the strength carriers within the region of the tire side walls is considerably less than within the region radially inwardly of said belt. In other words, the strength carriers have inwardly of the belt a number of twists which preferably is twice as great as the number of twists of the strength carriers in the tire side walls. As a result thereof, on one hand, an elastic expansion of the carcass threads inwardly of the belt is obtained while, on the other hand, it is assured that the strength carriers will not be yieldable in the tire side walls when being subjected to pull stresses, in other words, the strength carriers will be stiff in the longitudinal direction of the threads when the strength carriers are subjected to pull stresses.

Referring now to the drawing in detail, the pneumatic tire consisting primarily of rubber or rubber-like material has a carcass 1 which comprises cord threads 2 extending at a substantially right angle with regard to the circumferential direction of the tire. These cord threads 2 extend in an uninterrupted manner from bead to bead and are anchored to the beads by being looped around the cores 3.

Between the carcass 1 and the tread strip 4 there is provided a multi-layer belt 5 the layers 6 of which consist in a manner known per se of cord fabric. The course of the threads in the two layers 6 is such that the threads of one layer extend in one inclined direction with regard to the circumferential direction of the tire, whereas the threads of the other layer extend in the oppositely inclined direction with regard to the circumferential direction of the tire. These layers 6 form a band which is pull-resistant in the circumferential direction of the tire and which is able to stabilize the carcass 1, above all, against lateral forces.

Directly below the belt 5, the thread sections L of the carcass 1 are free from pull stresses. The thread sections S in the tire side walls 7, however, are under pull stresses when the tire is under its inner pressure. These pull forces are conveyed to the belt 5 from the carcass 1 in the direction of the arrows 8 approximately within the region of the shoulder portions, in other words, within the region of the thread sections U. The forces to be absorbed by the carcass 1 are thus centrally radially inwardly of the tread strip 4 absorbed by the belt 5 within the region U whereby the belt 5 is advantageously preloaded in the direction transverse of the tire.

As strength carriers 2 of the carcass 1, cord threads are employed which preferably consist of rayon or high polymers and are formed by a plurality of twisted yarns 9 or the like which in their turn are twisted with each other or follow a helical path. In view of the present invention, the number of twists of the strength carriers 2 within the regions S is approximately half the number of twists of the individual yarns 9 or the like in the region L radially inwardly of the belt 5. In the merging areas U, the number of twists gradually increases, when seen from the tire side walls 7, in the direction toward the belt 5.

The diagram of FIG. 4 shows the number Z of the twists for the individual regions L, S and U. While for the region S twist numbers of approximately 500 per meter are employed, the twist number within the region L amounts to approximately 1,000 per meter. Just for purposes of giving a specific example, the strength carriers 2 within the region S may have 480 twists per meter while in such an instance the strength carriers within the region L will have 900 twists per meter, the thickness of the strength carriers in said regions being assumed to be approximately the same. The diagram shows that the twist number Z within the regions U gradually increases and decreases respectively.

In view of the higher twist number in the region L, an increased elastic expansion or elongation in the longitudinal direction of the strength carriers 2 is possible, or in comparison to the region L, the stiffness of the strength carriers 2 in the longitudinal direction of the threads is considerably higher.

According to FIGS. 2 and 3, the strength carriers 1 which in one piece extend from one bead to the other bead have practically the same diameter. However, it is also possible to employ threads or strength carriers with different diameters for the region L on one hand and the region S on the other hand. In such an instance the strength carriers in region L preferably have the larger diameter.

It is, of course, to be understood that the present invention is, by no means, limited to the particular arrangement and construction shown in the drawing but also comprises any modifications within the scope of the appended claims. It may, however, also be emphasized that the thread portions or resistant carrier portions of the carcass within the region L are free from pull or tensile stresses not only when the tire is under its approximately normal inflation pressure of from one to three atmospheres above atmospheric pressure, preferably 1.9 atmospheres above atmospheric pressure, but also somewhat below and also above such pressure.

Furthermore reference may be had to U.S. Pat. No. 3,532,150 issued Oct. 6, 1970 disclosing a tire in which carcass thread sections below the tread strip are free from pull or tensile stresses.

It is, furthermore, to be understood that the term "strength carrier" as it appears in the specification and claims includes threads, yarns and wires.

What I claim is:

1. A pneumatic vehicle tire having a tread strip and a pull-resistant belt radially inwardly of said tread strip and extending approximately over the width of said tread strip, said tire also having beads and a carcass with twisted strength carriers extending from bead to bead in a direction at least approximately at a right angle with regard to the circumferential direction of the tire, those sections of said strength carriers which are located radially inwardly of said belt being at least approximately free from pull stresses when the tire is under its approximately normal inflation pressure, the number of twists of the strength carriers within the region of the side walls of the tire being considerably less than the number of twists of the strength carriers within the region radially inwardly of said belt.

2. A tire according to claim 1, in which the number of twists of the strength carriers within the region of the side walls of the tire approximately equals half the number of twists of the strength carriers within the region radially inwardly of the belt.

* * * * *